US011614012B2

(12) United States Patent
Niemann et al.

(10) Patent No.: US 11,614,012 B2
(45) Date of Patent: Mar. 28, 2023

(54) NONWOVEN SCREENS FOR DUST TRAPPING IN LASER DISCHARGE CHAMBERS

(71) Applicant: Cymer, LLC, San Diego, CA (US)

(72) Inventors: Ulrich Niemann, San Diego, CA (US); Walter Dale Gillespie, Poway, CA (US)

(73) Assignee: Cymer, LLC, San Diego, CA (US)

(*) Notice: Subject to any disclaimer, the term of this patent is extended or adjusted under 35 U.S.C. 154(b) by 170 days.

(21) Appl. No.: 16/763,328

(22) PCT Filed: Nov. 21, 2018

(86) PCT No.: PCT/US2018/062323
§ 371 (c)(1),
(2) Date: May 12, 2020

(87) PCT Pub. No.: WO2019/112809
PCT Pub. Date: Jun. 13, 2019

(65) Prior Publication Data
US 2020/0332689 A1  Oct. 22, 2020

Related U.S. Application Data

(60) Provisional application No. 62/594,768, filed on Dec. 5, 2017.

(51) Int. Cl.
*B01D 46/10* (2006.01)
*B01D 39/10* (2006.01)
(Continued)

(52) U.S. Cl.
CPC ............. *F01N 3/023* (2013.01); *B01D 39/10* (2013.01); *B01D 45/08* (2013.01); *B01D 46/10* (2013.01); *B01D 50/20* (2022.01); *B01D 2279/45* (2013.01)

(58) Field of Classification Search
CPC ........ B01D 46/10; B01D 45/08; B01D 39/10; B01D 24/4694; B01D 29/46; B01D 50/20; H01S 3/036; H01S 3/225; B32B 7/03
(Continued)

(56) References Cited

U.S. PATENT DOCUMENTS 5,018,161 A    5/1991  Akins et al.
5,176,499 A *  1/1993  Damlis .................. B23P 15/04
                                                  29/888.024
(Continued)

FOREIGN PATENT DOCUMENTS

CA         2054112 A1    5/1992
CN       102245074 A    11/2011
(Continued)

OTHER PUBLICATIONS

Office Action, counterpart Korean Patent Application No. 10-2020-7016275, dated Apr. 30, 2022, 11 pages total (including English translation of 4 pages).
(Continued)

*Primary Examiner* — Minh Chau T Pham
(74) *Attorney, Agent, or Firm* — DiBerardino McGovern IP Group LLC (57) ABSTRACT

A system for removing particulate matter from the gas in a gas discharge laser includes one or more nonwoven screens which are optimized for, among others, manufacturability and feature integration. The nonwoven screens are configured for precisely directing the flow to optimize the separation of particles from the gas flow and provide sufficient surface area for improved dust adherence.

19 Claims, 9 Drawing Sheets

(51) Int. Cl.
  *B01D 50/20* (2022.01)
  *B32B 7/03* (2019.01)
  *F01N 3/023* (2006.01)
  *B01D 45/08* (2006.01)
(58) Field of Classification Search
  USPC .................. 55/385.1, 501; 210/275, 488
  See application file for complete search history.

(56) References Cited

U.S. PATENT DOCUMENTS

| | | | | |
|---|---|---|---|---|
| 5,286,392 | A * | 2/1994 | Shea | B01D 24/4694 |
| | | | | 210/275 |
| 5,359,620 | A * | 10/1994 | Akins | H01S 3/225 |
| | | | | 372/98 |
| 5,373,523 | A | 12/1994 | Fujimoto et al. | |
| 5,810,898 | A * | 9/1998 | Miller | B01D 46/10 |
| | | | | 55/501 |
| 6,510,948 | B1 * | 1/2003 | Barnett | B01D 29/46 |
| | | | | 210/488 |
| 6,570,899 | B1 * | 5/2003 | Yabu | H01S 3/225 |
| | | | | 372/50.1 |
| 7,522,650 | B2 | 4/2009 | Partlo et al. | |
| 2003/0039291 | A1 * | 2/2003 | Geiger | H01S 3/036 |
| | | | | 372/55 |
| 2004/0011204 | A1 | 1/2004 | Both | |
| 2005/0048806 | A1 | 3/2005 | Li | |
| 2005/0226301 | A1 | 10/2005 | Partlo et al. | |
| 2008/0028581 | A1 | 2/2008 | Ronzani | |
| 2010/0083833 | A1 | 4/2010 | Morphey | |
| 2010/0107870 | A1 | 5/2010 | Morton et al. | |
| 2011/0272112 | A1 | 11/2011 | Aberg et al. | |
| 2012/0298970 | A1 * | 11/2012 | Lee | C23C 14/042 |
| | | | | 438/34 |
| 2013/0101805 | A1 | 4/2013 | Altshuler et al. | |
| 2015/0267348 | A1 | 9/2015 | Manninen | |

FOREIGN PATENT DOCUMENTS

| | | |
|---|---|---|
| CN | 102264971 A | 11/2011 |
| CN | 103025941 A | 4/2013 |
| CN | 103657262 A | 3/2014 |
| CN | 104822521 A | 8/2015 |
| DE | 20218254 U1 | 2/2003 |
| EP | 1243304 A2 | 9/2002 |
| JP | H0341790 A | 2/1991 |
| JP | H04137574 A | 5/1992 |
| JP | H05175583 A | 7/1993 |
| JP | H10118569 A | 5/1998 |
| JP | H1142867 A | 2/1999 |
| JP | 2001164923 A | 6/2001 |
| JP | 2007531312 A | 11/2007 |
| JP | 2017159629 A | 9/2017 |
| KR | 20150075238 A | 7/2015 |
| WO | 9630105 A1 | 10/1996 |
| WO | 2005104313 A2 | 11/2005 |

OTHER PUBLICATIONS

Office Action, counterpart Japanese Patent Application No. 2020-527759, dated Jul. 15, 2021, 11 pages total (including English translation of 6 pages).

Office Action, counterpart Chinese Patent Application No. 201880078505.6 dated Jun. 15, 2021, 22 pages total (including English translation of 9 pages).

Shane Thomas, U.S International Searching Authority, International Search Report and Written Opinion, corresponding PCT Application No. PCT/US2018/062323 dated Jan. 31, 2019, 9 pages total.

\* cited by examiner

NONWOVEN SCREENS FOR DUST TRAPPING IN LASER DISCHARGE CHAMBERS

CROSS-REFERENCE TO RELATED APPLICATIONS

This application claims priority of U.S. application 62/594,768 which was filed on Dec. 5, 2017 and which is incorporated herein in its entirety by reference.

FIELD

The present invention relates to gas discharge lasers, e.g., those used in the production of sources of light, e.g., DUV light, for exposing integrated circuit photoresists in integrated circuit lithography manufacturing processes.

BACKGROUND

It is known that in gas discharge lasers, for example, those using fluorine in the laser gas, e.g., KrF, ArF, and F2 gas discharge lasers, there is a propensity for the production of debris in the form of metal fluorides due to the interaction of fluorine with metallic components within the laser gas discharge chamber. Such gas discharge lasers may be used particularly at or about a selected desired center-wavelength, e.g., for KrF gas discharge lasers at about 248 nm and for ArF gas discharge lasers at about 193 nm. This debris can, over time, plate out on various surfaces such as those of optical components of the laser chamber, e.g., chamber windows, which can cause reduced output power for a number of reasons, e.g., undesired reflection of laser light off of the optic and/or blockage of transmission of laser light through the optic. This can cause the need to operate the laser at an undesired elevated discharge voltage resulting in reduction in laser chamber lifetime.

In addition, under some conditions, depending on fluence levels and wavelength, among other things, the plated debris can cause localized high absorption on an optical element, resulting in earlier-than-normal failure of the optical element under, e.g., DUV light at high fluence. Debris in the form of dust entrained in the flowing gas can also cause scatter loss. This phenomenon can cause photons generated in a gas discharge between the electrodes of the gas discharge laser to so scatter that the photons do not reach the mirrors in the laser resonance cavity in sufficient quantities to cause adequate lasing in the excited gas medium during the discharge. This can be significant enough, when the dust content is high enough, that no lasing occurs at all in a given pulse or pulses.

This phenomenon increases in frequency and likelihood as the dust accumulates in the chamber over the life of the chamber, e.g., measured in billions of pulses, and eventually can lead to, or at least be a significant contributor to, what is referred to in the industry as old age syndrome ("OAS"), the onset of which generally requires chamber replacement to maintain the required output laser pulse energy (dose), and may also affect other requirements such as pulse to pulse parameter stability requirements.

Taking one type of metal component as an example, electrodes in the chamber wear during operation, generating Metal Fluoride (MF) dust. To keep the dust from interfering with chamber operation, two systems are currently employed. Several layers of mesh screens are installed on the bottom of the chamber to separate particles from the gas flow. In addition a smaller cylindrical chamber (a metal fluoride trap or MFT) is attached to the main chamber which houses additional screens and an electrostatic precipitator. The MFT has an input port from the chamber and output ports returning to the chamber such that chamber gas flows out of the chamber, through the debris trap, and back into the chamber. MFTs are disclosed, for example, in U.S. Pat. No. 5,018,161, titled "Compact Excimer Laser," issued on May 21, 1991, U.S. Pat. No. 5,373,523, titled "Excimer Laser Apparatus," issued on Dec. 13, 1994, and U.S. Pat. No. 6,570,899, titled Gas Laser Device, issued on May 27, 2003, all of which are incorporated by reference in their entirety. Various aspects of dust trapping systems are disclosed, for example, in U.S. Pat. No. 7,522,650, issued Apr. 21, 2009, and U.S. Patent Application Publication No. 2010/0107870, published May 6, 2010, both of which are incorporated by reference in their entirety.

In conventional systems the mesh screens installed in the MFT and on the bottom of the chamber are standard brass weave meshes that require special cleanliness to conform to the high purity application requirements. At the end-of-life of a chamber, due to their structure, these screens cannot be easily cleaned to sufficient levels and hence need to be discarded. In addition several layers are used to provide sufficient collection capacity, resulting in very high surface area and potential for trapping contaminants. In the MFT these screens also function as flow barriers which direct the gas along a desired flow path. As the screens accumulate dust the flow directing properties and thus the flow path changes during the chamber life time in an unpredictable manner. The placement of multiple layers of these screens during manufacturing is error prone and may affect the ability to direct the flow as intended and the accumulation of dust particles.

There is thus a need to be able to provide a dust trapping system design that efficiently traps dust.

SUMMARY

The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments. Its sole purpose is to present some concepts of one or more embodiments in a simplified form as a prelude to the more detailed description that is presented later.

The proposed invention aims to replace the current weave-type screens with thin metal sheets with custom raised structural features which may be combined with hole patterns. The raised structural features and holes, of present, may be realized by manufacturing techniques such as metal stamping or photo or chemical etching. The ability to use such manufacturing techniques provides in turn the ability to tailor the screen pattern to provide surface area, void fraction, and raised features specific to a given application. This enables precisely directing the flow to optimize the separation of particles from the gas flow and provide sufficient surface area for dust adherence. Secondly the screen structure allows the use of manufacturing methods that permit the integration of mounting and locking features, such as latches, as part of the patterning process without the use of subsequent post production steps. These screens can be fabricated from a much wider range of alloys than are available for meshed screens, which allows optimization with regards to corrosion resistance and particle attraction. If required custom finishes can be applied more easily as well. This is a consequence of the structural simplicity (reduction of creases, nodes) which will also allow wash down of these parts to high cleanliness standards.

Thus, according to a first aspect there is disclosed a system for removing particulate matter from gas in a discharge chamber of a gas discharge laser, the system comprising a filter in fluid communication with the discharge chamber, the filter comprising at least one nonwoven screen. The filter may be located within the discharge chamber, which may have a bottom, in which case the filter may be located adjacent the bottom of the discharge chamber. The filter may be located outside the discharge chamber and the system additionally may comprises at least one port connecting the filter to an interior of the discharge chamber. The at least one nonwoven screen may have a plurality of raised features, and also may have a plurality of pores, the dimensions and positioning of the raised features and the dimensioning and positioning of the pores being such that a velocity of a portion of the gas passing over the screen around the raised features may be reduced to below a settling velocity of a substantial amount (e.g., a majority) of the particulate matter entrained in the gas. The gas may be caused to flow over a surface of the at least one nonwoven screen in a first direction and the at least one nonwoven screen may have a plurality of pores with an associated raised feature, the associated raised feature for each pore being positioned such that the raised feature is upstream of the pore when the gas is flowing in the first direction.

The gas may be caused to flow over a surface of the at least one nonwoven screen in a first direction and the at least one nonwoven screen has a plurality of substantially rectangular pores with an associated substantially rectangular raised feature, the associated raised feature for each pore being positioned such that the raised feature is upstream of the pore when the gas is flowing in the first direction. The pore may have a length measured in the first direction in the range of about 1 mm to about 10 mm. The pore may have a width measured transverse to the first direction in the range of about 1 mm to about 10 mm.

The gas may be caused to flow over a surface of the at least one nonwoven screen in a first direction and the at least one nonwoven screen may have a plurality of substantially rectangular pores with an associated substantially rectangular raised feature, the associated raised feature for each pore being positioned such that the raised feature is downstream of the pore when the gas is flowing in the first direction.

The nonwoven screen may be fabricated using a laser etching technique, a photoetching technique, a metal stamping technique, a deposition technique, an expanded metal technique, or some combination of these technique.

According to another aspect there is disclosed a method of removing particulate matter from gas in a discharge chamber of a gas discharge laser, the method comprising the steps of placing a filter in fluid communication with the discharge chamber, the filter comprising at least one nonwoven screen, and flowing the gas over the filter. The placing step may include locating the filter within the discharge chamber. The discharge chamber may have a bottom and the placing step may include locating the filter adjacent the bottom of the discharge chamber. The placing step may include locating the filter outside the discharge chamber and the step of flowing the gas over the filter may include flowing gas through at least one port connecting the filter to an interior of the discharge chamber.

According to another aspect there is disclosed a method of making a nonwoven screen comprising using photoetching to create an array of raised features, or raised features and pores.

According to another aspect there is disclosed a method of making a nonwoven screen comprising using metal stamping to create an array of screen elements, each of the screen elements comprising a first structure defining a raised feature adjacent the hole. The screen elements may also comprise a second structure defining a hole.

Further embodiments, features, and advantages of the present invention, as well as the structure and operation of the various embodiments are described in detail below with reference to accompanying drawings.

BRIEF DESCRIPTION OF THE DRAWING

The accompanying drawings, which are incorporated herein and form part of the specification, illustrate the methods and systems of embodiments of the invention by way of example, and not by way of limitation. Together with the detailed description, the drawings further serve to explain the principles of and to enable a person skilled in the relevant art(s) to make and use the methods and systems presented herein. In the drawings, like reference numbers indicate identical or functionally similar elements.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments. The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments.

In the description that follows and in the claims the terms "up," "down," "top," "bottom," "vertical," "horizontal," and like terms may be employed. These terms are intended to show relative orientation only and not any orientation with respect to gravity.

Also, as used herein, the term "screen" is used to refer to structures, devices, and arrangements which may or may not include through holes, pores, or apertures.

Figure 1:
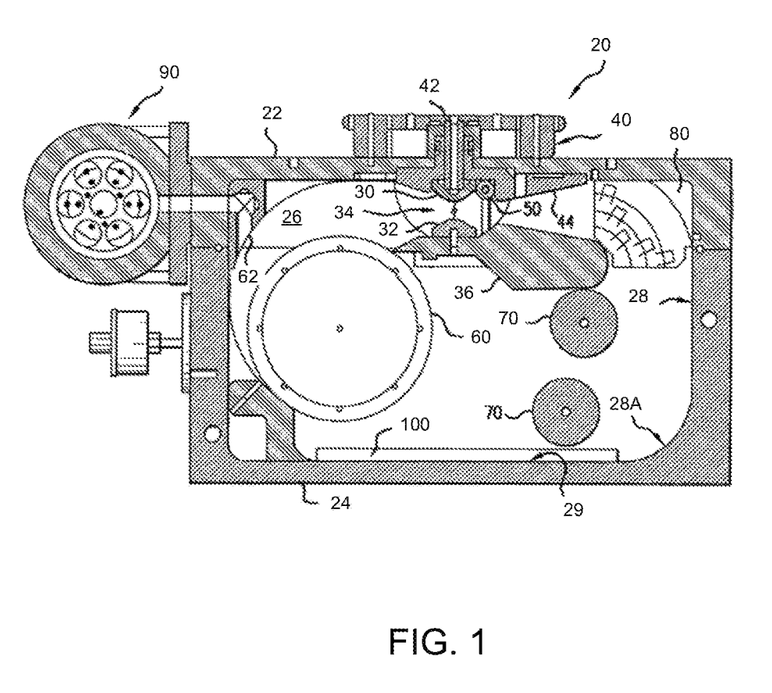
FIG. 1 is a cross-sectional partly schematic view of a gas discharge laser chamber according to aspects of an embodiment of the present invention, with the cross-section taken transverse to an optical axis of laser output light beams produced in the gas discharge laser chamber.

Turning now to FIG. 1 there is shown a gas discharge laser system gas discharge chamber 20 according to an aspect of an embodiment of the present invention. The chamber 20 may be composed, e.g., of a chamber upper half 22 and a chamber lower half 24, which may, when connected to each other by suitable means, e.g., by bolting, serve to define a chamber interior 26. The chamber upper half 22 and chamber lower half also define, e.g., a chamber interior vertical wall 28 and the chamber lower half 24 defines a chamber interior horizontal bottom wall 29.

Also contained within the chamber 26 is, e.g., a gas discharge system comprising two elongated opposing electrodes, cathode 30 and anode 32, defining between them a gas discharge region 34, wherein in response to sufficient voltage being present across the cathode 30 and anode 32 the gas between the electrodes in the also elongated discharge region 34 conducts and certain chemical and electrical reactions take place in the ionized plasma of the discharge that result in the production of radiation, e.g., at or near a characteristic center wavelength, that is optically directed along the optical axis of an output laser light pulse generally aligned to the longitudinal axis of the electrodes 30 and 32.

Also within the chamber 26 may be, e.g., an anode support bar 36. The anode may be connected to the chamber upper half 22 through a plurality of current returns, with the chamber top 22, along with the chamber bottom 24, e.g. kept as a common voltage, e.g., at ground voltage.

The cathode 32 may, e.g., be connected to an electrical discharge high voltage feed through assembly 40, e.g., by a high voltage feed through 42, which passes through a main insulator 44. The main insulator 44 may keep the cathode electrically isolated from the chamber upper half 22. Also within the chamber interior 26 may be, e.g., a preionizer 50, e.g., in the vicinity of the cathode 30.

Also within the gas discharge chamber 26 may be a gas circulation system comprising a gas circulation fan 60, which may be, e.g., a generally cylindrical crossflow fan 60. The fan 60 serves to move gas within the chamber interior 26, generally in a circular fashion as seen in the cross-sectional view of FIG. 1, in order to remove from the discharge region 34 between successive gas discharges the gas that contains ionized particles and debris and depleted F2, to replenish the discharge region with fresh gas before the next gas discharge. The gas circulation system may also include a plurality of heat exchangers 70 in the generally circular gas flow path to remove heat added to the gas, e.g., by the discharges and the operation of the fan 60.

The gas circulation system may also have a plurality of curved baffles 80 and a flow directing vane 62, which may serve to shape the generally circular gas flow path out of the discharge region 34 toward the heat exchangers 70 and ultimately the intake of the fan 60, and from the output of the fan 60 to the discharge region 34, respectively.

The chamber 26 may also have attached to a metal fluoride trap (MFT) 90 in fluid communication with an interior of chamber 26 and may also have a dust trap 100 positioned along the horizontal bottom interior wall 29 of the bottom 24 of the chamber 26. It will be understood that by dust is meant the various forms of debris, e.g., mostly metal fluoride material, that circulate with the gas circulation and appear to the naked eye to be dust-like or lint-like. The MFT 90 may be configured as an annular channel. One or more screens are rolled up and placed in the channel to provide particle removal from gas flowing through the channel.

The MFT 90 and the dust trap 100 include screens for removing dust from the gas in chamber 26. These screens are typically woven mesh screens which are prone to several problems including that they are difficult to wash and so generally cannot be re-used. "Woven" here means formed by interlacing wires or other thin strips of material. According to an aspect of an embodiment of the present invention the screens in the MFT 90 and the dust trap 100 are not woven but are instead fabricated using a nonwoven technology such as metal stamping and/or photoetching. "Not woven" and "nonwoven" here mean formed by a method other than by interlacing wires or other thin strips of material.

Figure 2:
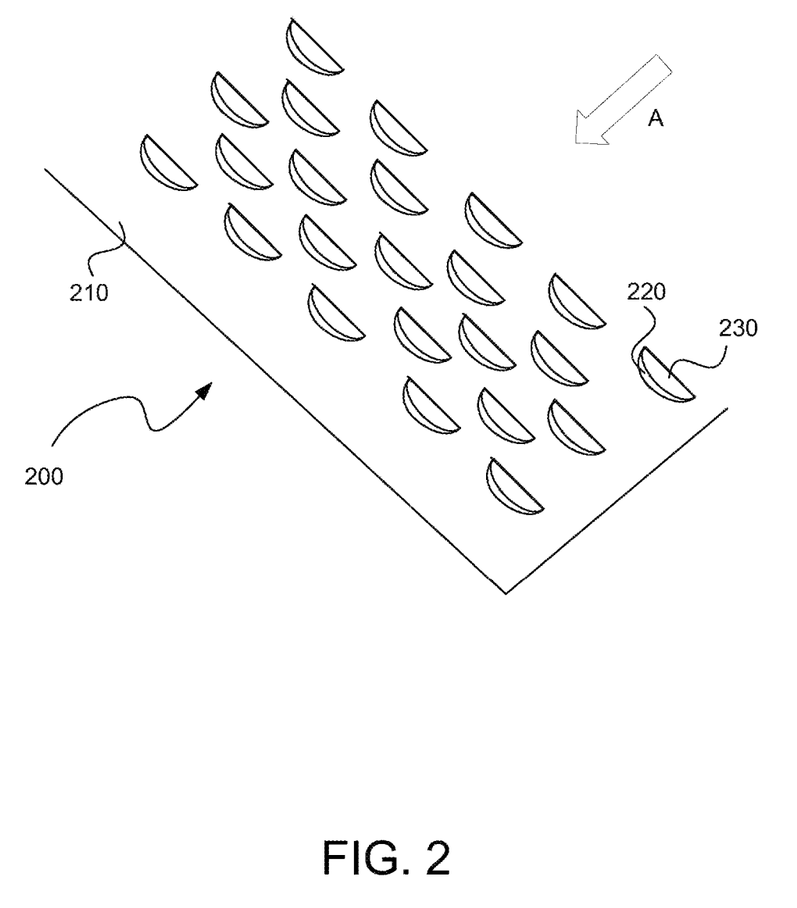
FIG. 2 is a perspective view of a screen according to aspects of an embodiment of the invention.

Such a screen is shown in FIG. 2. FIG. 2 shows a screen 200 made from a plate 210 generally made, for example, of a metallic material. The screen 200 includes an array (ordered or nonordered) of pores 220. In the arrangement shown the array is ordered as a series of rows and columns, with adjacent rows being staggered with respect to one another. Also, in the arrangement shown, each of the pores 220 is crescent shaped, but it will be appreciated that the pores 220 may have a different shape, e.g., rectangular, circular, elliptical, curvilinear, trapezoidal, polygon, crescent, and so on. Although all of the pores 220 in the array are the same size and shape, it will be appreciated that this is not necessary, and that in general the array may include pores 220 of varying sizes and shapes.

In the arrangement shown, each of the pores 220 has an associated raised feature 230. It will be appreciated that not all of the pores 220 necessarily need to have a raised feature 230 and it is possible to construct a screen 200 in which some of the pores 220 have raised features 230 and others do not. It will also be appreciated that not all of the raised features 230 need to have an associated pore 220 and it is possible to construct a screen 200 in which some of the raised features 230 have pores 220 and others do not. In the arrangement shown each of the raised features 230 is generally dome shaped so as to block and redirect gas flowing over the surface of the plate 210 in the direction of arrow A, to create a low pressure zone downstream of the raised feature, but it will be appreciated that the raised features 230 may have a different shape, e.g., rectangular, circular, elliptical, curvilinear, trapezoidal, polygon, crescent, and so on. Although all of the raised features 230 in the array are the same size and shape, it will be appreciated that this is not necessary, and that in general the array may include raised features 230 of varying sizes and shapes.

While in the arrangement shown the raised feature or protrusion 230 is upstream of the pore 220, it is also possible to have an arrangement in which the raised feature is positioned downstream of the pore creating a low pressure/low velocity zone upstream of the raised feature 230.

Figure 3:
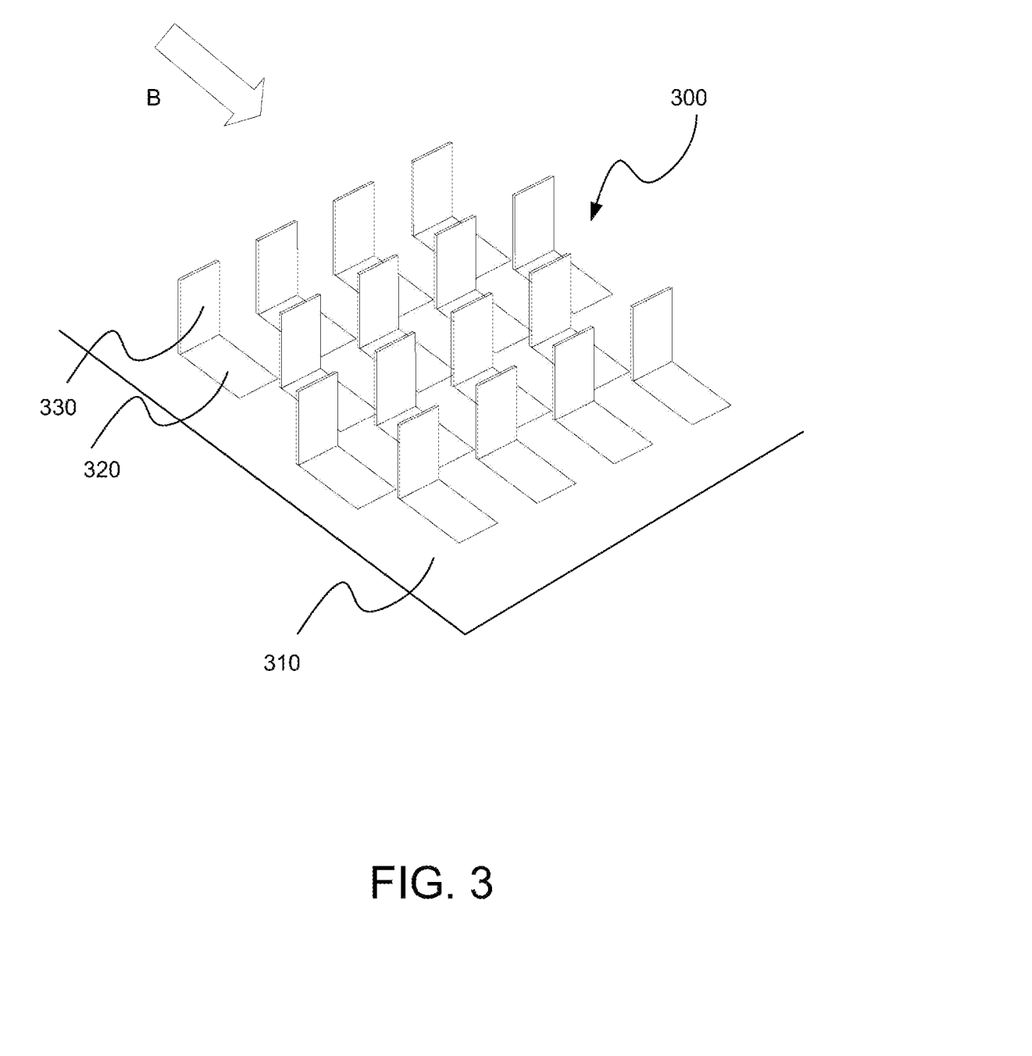
FIG. 3 is a perspective view of a screen according to aspects of another embodiment of the invention.

FIG. 3 shows a screen 300 made from a plate 310 generally made, for example, of a metallic material. The screen 300 includes an array (ordered or nonordered) of pores 320. In the arrangement shown the array is ordered as a series of rows and columns, with adjacent rows being staggered with respect to one another. Also, in the arrangement shown, each of the pores 320 is generally rectangular, but it will be appreciated that the pores 320 may have a different shape, e.g., circular, elliptical, curvilinear, trapezoidal, polygon, crescent, and so on. Although all of the pores 320 in the array are the same size and shape, it will be appreciated that this is not necessary, and that in general the array may include pores 320 of varying sizes and shapes.

In the arrangement shown in FIG. 3, each of the pores 320 has an associated raised feature 330. It will be appreciated that not all of the pores 320 necessarily need to have a raised feature 330 and that it is possible to construct a screen 300 in which some of the pores 320 have raised features 330 and others do not. It will also be appreciated that not all of the raised features 330 need to have an associated pore 320 and it is possible to construct a screen 300 in which some of the raised features 330 have pores 320 and others do not. In the arrangement shown each of the raised features 330 is rectangular so as to block and redirect gas flowing over the surface of the plate 310 in the direction of arrow B, to create a low pressure zone downstream of each of the raised features 330. It will be appreciated that the raised features 330 may have a different shape, e.g., circular, elliptical, curvilinear, trapezoidal, polygon, crescent, and so on. Although all of the raised features 330 in the array are the same size and shape, it will be appreciated that this is not necessary, and that in general the array may include raised features 330 of varying sizes and shapes.

In the arrangement shown gas could be flowing over the surface of the plate 310 in a direction opposite to that of arrow B, to create a low pressure zone upstream of the raised feature. The gas, is however, flowing predominantly over rather than predominantly through the plate 310.

The screen 200 and the screen 300 are configured to divert the flow of gas flowing over and/or through them. The combination of raised features and appropriately dimensioned pores or openings allows for gas control not just based on pressure drop but also by manipulating the flow streamlines. The geometric features and patterning of the screens can also be configured to so that they are easier to clean compared to a woven mesh so that it is more likely the screens can be reused.

Figure 4A:
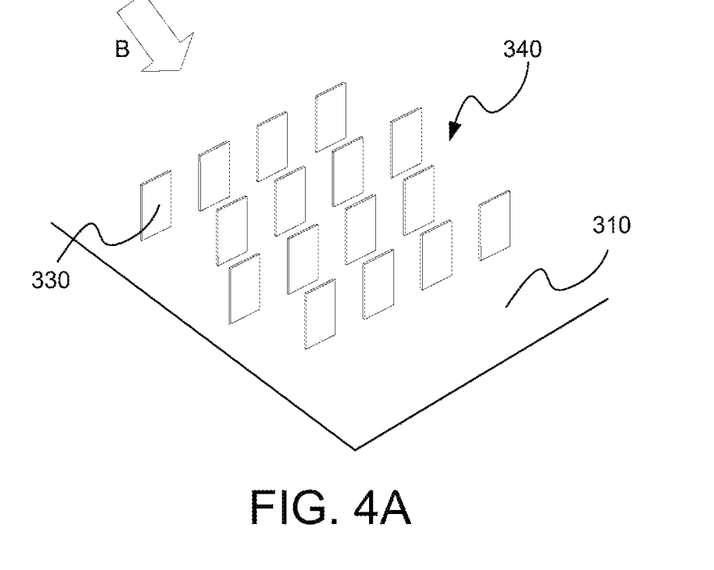
FIG. 4A is a perspective view of a screen according to aspects of another embodiment of the invention and FIG. 4B is a side view of the screen of FIG. 4A.
Figure 4B:
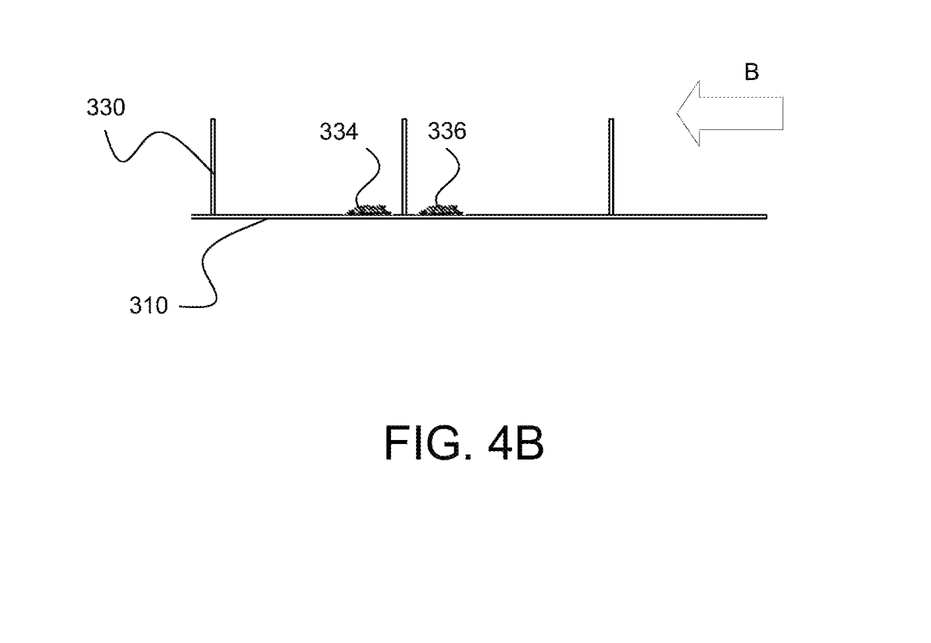

The screens eliminate a substantial amount (e.g., a majority) of the particulate matter in gas flowing over the screens the areas of low pressure/low particle velocity that form downstream, and to some extent, upstream of the raised features. If an aperture or pore is present, then the particulate matter may be caused to pass though the pore either by a pressure differential across, and consequent gas flow though, the pore, this removing it from the main gas stream. Also, depending on orientation of the screen gravity may contribute to this effect. Also, however, because the particles tend to be sticky, slowing them down can cause them to adhere to the surfaces of the screen, providing another effective mechanism for removing them. For example, FIG. 4A shows a screen 340 lacking any apertures. In such an arrangement the particulate matter is removed predominantly by slowing it enough that it sticks to the surfaces of the screen 340. This effect will be the most pronounced in the low pressure zone downstream of the raised feature 330, as shown in FIG. 4B, in which a mass 334 of particulate matter accumulates at the base on the downstream side of the raised feature 330. A mass 336 of particulate matter will also accumulate at the base on the upstream side of the raised feature 330. Because the particles are sticky, they will adhere to and accumulate on other surfaces as well.

Figure 5:
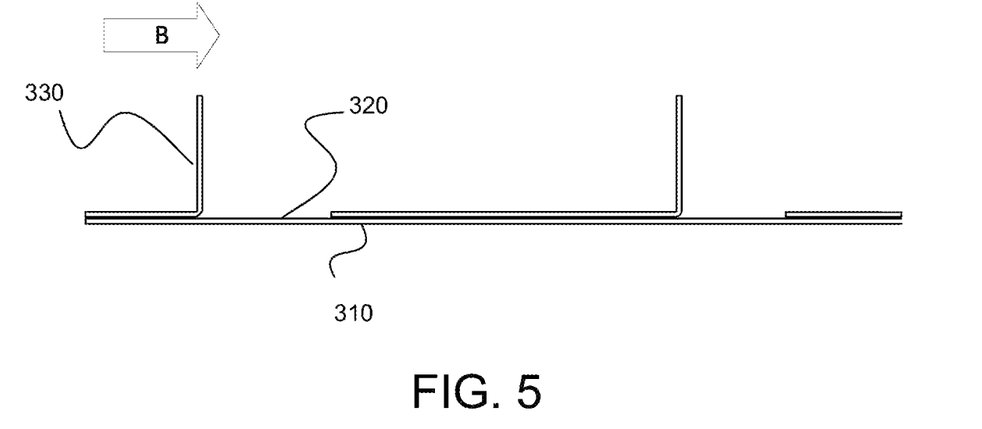
FIG. 5 is a side view of a screen according to aspects of another embodiment of the invention.

FIG. 5 shows a screen 5 lacking any through apertures but instead with depressions 325. In such an arrangement the particulate matter is removed predominantly by slowing it enough that it sticks to the surfaces of the screen. This effect will be the most pronounced in the low pressure zone downstream of the raised feature 330 in the depression 325.

Figure 6:
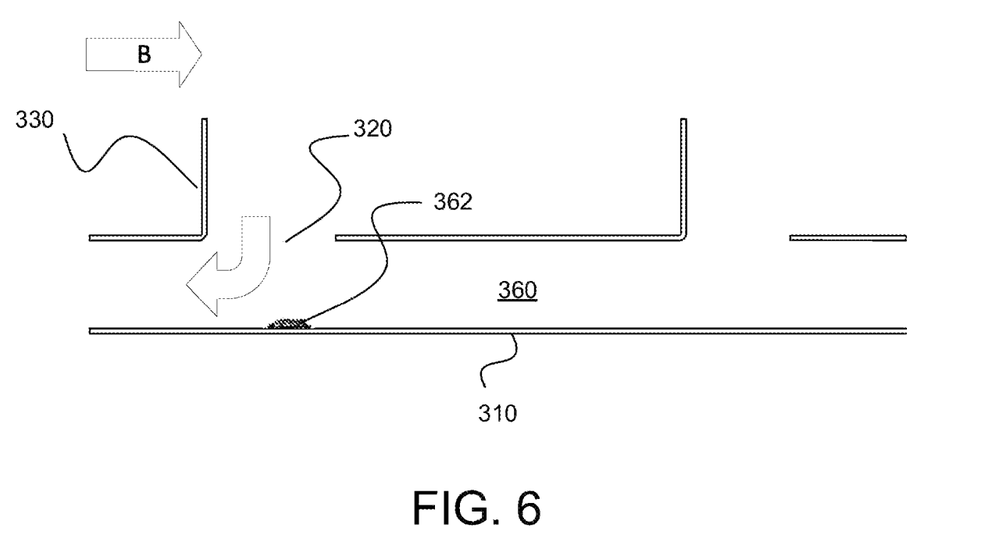
FIG. 6 is a side view of a screen according to aspects of another embodiment of the invention.

FIG. 6 shows a screen with raises features 330 and openings 320 in which the openings 320 open into a conduit or plenum 360. In such an arrangement the particulate matter is also removed by slowing it enough that passes through the opening 320 and accumulates in the plenum 360. A gas flow may also be set up in the plenum 360 to create a low pressure zone at the openings and to convey the particulate latter to another location. Some of the particulate matter may also accumulate as a mass 362 within the plenum 360. Because the particles are sticky, they will tend to adhere to and accumulate on other surfaces as well.

As regards selection of dimensions and shapes, dust particles, in particular the metal-fluoride particles found in discharge chambers, readily adhere to any surface if given the opportunity. The forces causing adherence are more effective the slower the relative motion of particle versus surface is, or the longer the residence time (particles at rest). Secondly the flow must be such that particles frequently come in contact with solid surfaces. While there are multiple physical parameters and properties that are relevant, flow regime and flow velocity are dominant.

As regards flow regime, the gas flow at the screen should preferably be laminar, since turbulence increases the chance of localized elevated velocities, as well as moving eddies that can randomly entrain settled particles back into the gas flow. These localized elevated velocities and moving eddies present engineering challenges in designing the trap. Therefore steady, laminar flow is desired. The Reynolds number which is the quantity used to predict the flow regime should be less than 50 for the chamber screen designs considered here.

$$Re = \frac{\rho uL}{\mu} = \frac{uL}{v}$$

Where:
ρ is the density of the fluid (SI units: kg/m³);
u is the velocity of the fluid with respect to the object (m/s);
L is a characteristic linear dimension (m);
μ is the dynamic viscosity of the fluid (Pa·s or N·s/m² or kg/m·s); and
ν is the kinematic viscosity of the fluid (m²/s).

This number can derived from backward-facing step theory. When an obstacle partially blocks a flow, a low pressure environment is created on the backside of the obstacle which leads to gas flowing towards the backside. The generated swirl is steady for low Reynolds numbers. As the Reynolds number increases these vortices start to oscillate and eventually become unsteady. In the context of particle traps these vortices provide areas that have localized velocities which are orders of magnitude slower than the main flow, which provides optimal conditions to settle out dust.

This leads to consideration of flow velocity. Chamber gas flows at velocities of around 20-40 m/s. For particles of certain size and weight, there exists a flow velocity at which the forces exerted by the gas will not suffice to keep them suspended. This is called the settling velocity. The smaller a particle, the slower the flow needs to be for it to drop out and gravitationally settle.

$$w = \frac{2(\rho_p - \rho_f)gr^2}{9\mu}$$

Where:
w is the settling velocity;
$\rho_p$ is particle density;
$\rho_f$ is fluid density;
g is the acceleration due to gravity;
r is the radius of the particle; and
$\mu$ is the dynamic viscosity of the fluid.

Figure 7:
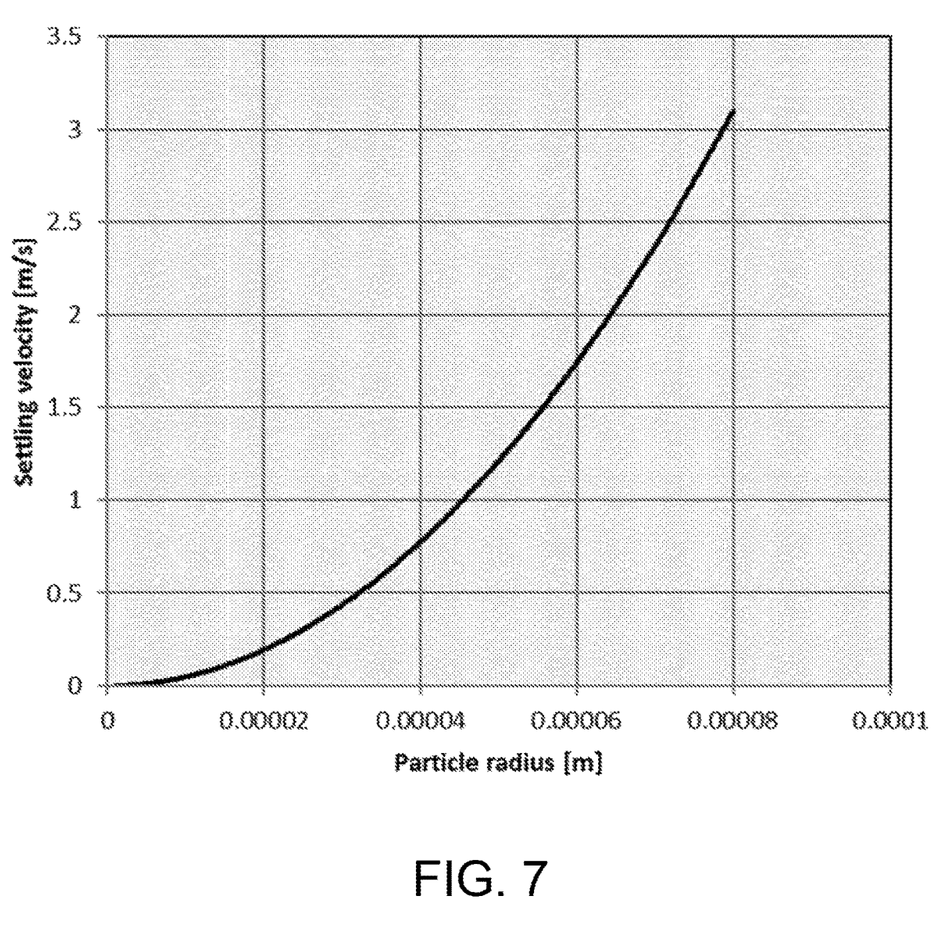
FIG. 7 is a graph used in conjunction with illustrating some principles underlying aspects of some embodiments of the invention.

Using the particle size distribution of chamber dust which is between 0.5-50 microns, depending on whether to consider discrete particles or commonly occurring agglomerations, in conjunction with gas viscosity and respective densities, this parameter can be derived. FIG. 7 is a graph showing settling velocity as a function of particle radius.

From this calculation it can be assumed that the gas stream needs to be reduced to <1 m/s from the free stream to achieve the desired functionality of a dust capturing device.

Figure 8A:
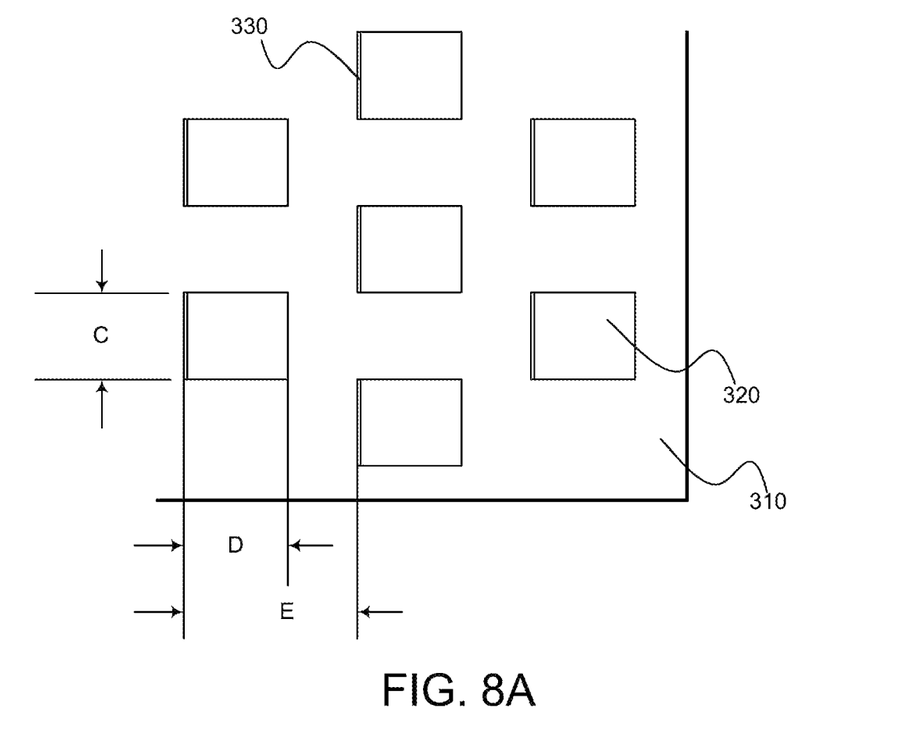
FIG. 8A is a top plan view and FIG. 8B is a side plan view of a screen according to aspects of another embodiment of the invention.
Figure 8B:
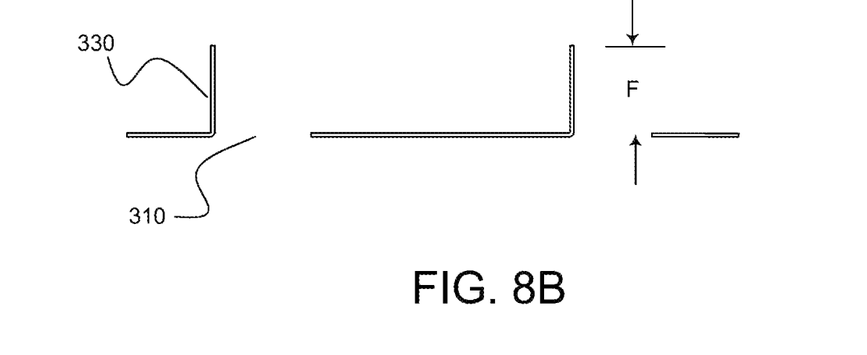

For example, for the screen 300, as shown in FIGS. 8A and 8B, the pore 320 may have a width measured transverse to flow (dimension C) in the range of microns to millimeters. The pore 320 may have a length measured parallel to flow (dimension D) in the range of about 1 mm to about 10 mm. The pores 220 may be arranged in staggered rows with the distance from one raised feature 230 to the raised feature 230 in the next row next (dimension E) is on the order of millimeters. The raised features may have a height (dimension F in FIG. 5B) in the range of about 3 mm to about 15 mm although this dimension may be determined to fill a space between the screen 300 and an adjacent structure, e.g., an annular wall of the MFT 90, another screen, or another portion of the same screen if the screen is rolled or folded.

Figure 9A:
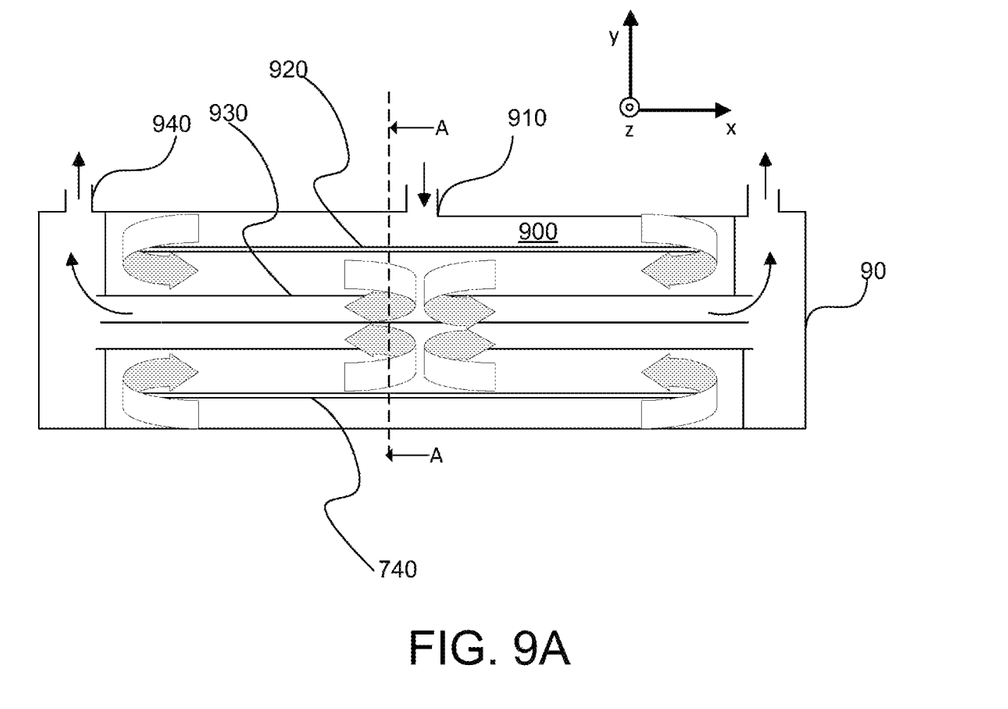
FIG. 9A is a cutaway side view of a screen according to aspects of another embodiment of the invention.

As shown in FIG. 9A, in the MFT 90, the gas first flows through an annular duct 900. The clearance between the inner and outer shell of the annular duct 900 is on the order of millimeters. The flow rate through the MFT during laser operation is on the order of 100 cm³/sec, which leads to a flow velocities on the order of cm/sec. To implement the above described concept, dimensioning and spacing the raised features or protrusions may be derived from backward facing step theory. The height of the protrusions may be selected such that the full space between the shells is occupied and no by-passing occurs. The width and lateral separation distance determine the "throttling" of the gas, which locally accelerates the gas and influences the Reynolds number. Carefully balancing these parameters the proper flow regime can be established. Then the length of the recirculation area behind the protrusions, in which the dust will accumulate, can be calculated. For the conditions described here these are equal to the protrusion width. Spacing of the rows of protrusions is doubled when designing the screens to allow the flow to straighten out before encountering the next protrusion. Thus the flow passes through a ram scoop 910 and through the annular duct 900, in the process passing over the surface of a screen 920 or layered screens 920 made according to the teachings herein. The gas then is diverted to pass over an electrostatic precipitator 930 after which it is directed to an outlet port 940.

Figure 9B:
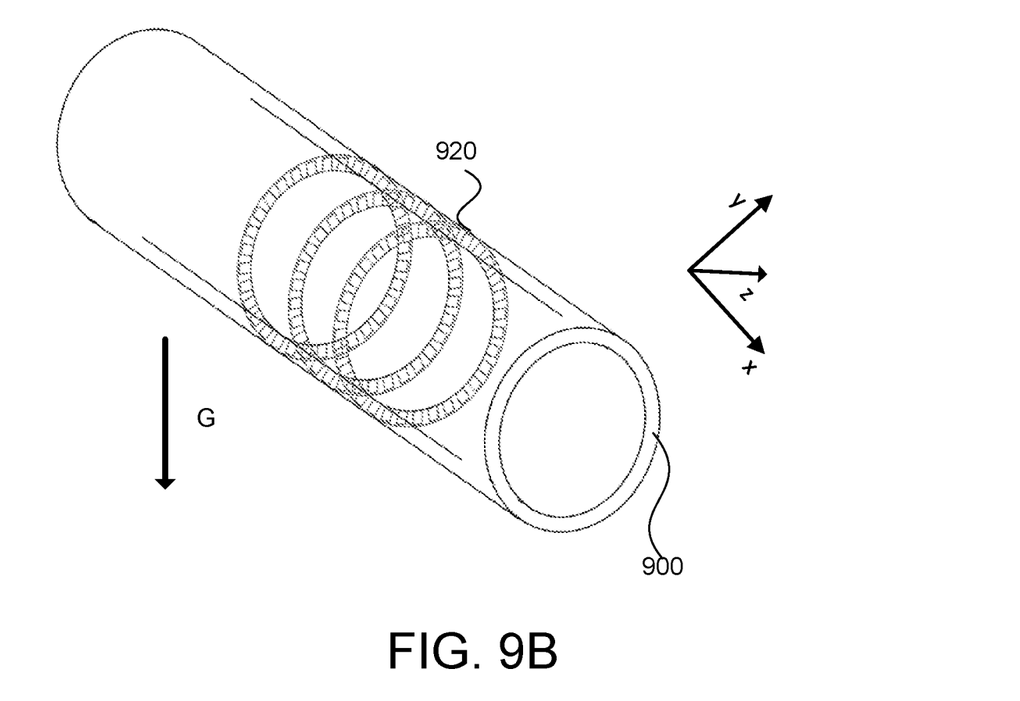
FIG. 9B is a partially cutaway perspective view of a component of the embodiment of FIG. 9A.
Figure 9C:
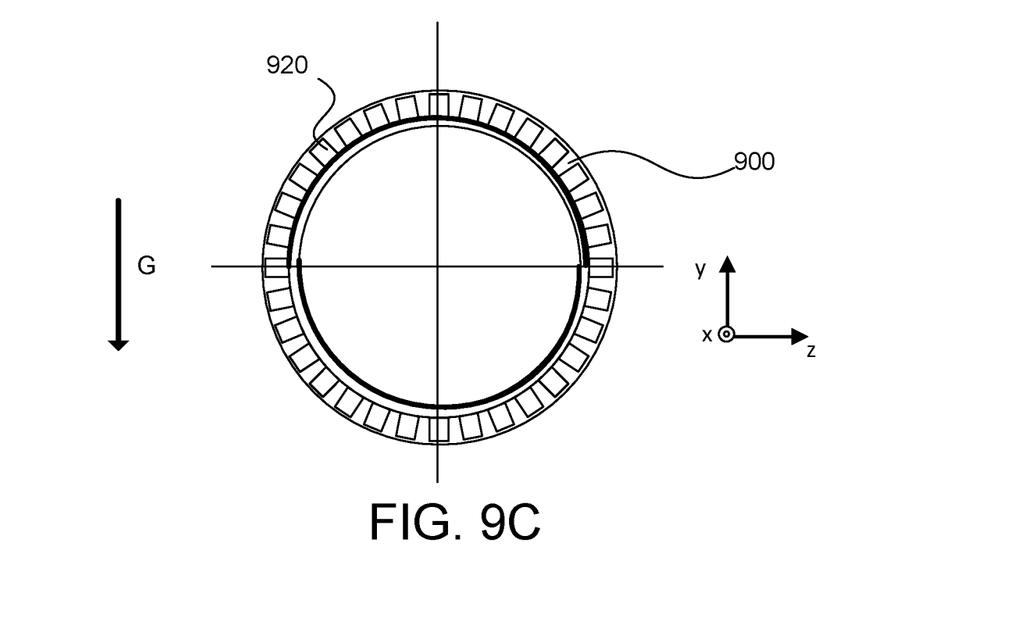
FIG. 9C is an end on view of the component of FIG. 9B.

FIG. 9B is a partially cutaway perspective view of the annular duct 900 and the screen 920 positioned within it. The screen 920 in the arrangement shown has protrusions or raised features that are sized to essentially fill the annular duct 900 in the radial direction. Gas flows in the annular duct 900 and particulate matter in the gas flow slows and adheres to surfaces such as the surfaces of screen 920 and the interior surfaces of the annular duct 900. This is shown in connection with FIG. 9C. When the annular duct 900 is oriented as shown, gravity, the direction of which is indicated by arrow G, will tend to cause particulate matter to accumulate on upward-facing surfaces as indicated by the thickened lines, although particles will in general tend to adhere to surfaces that have other orientations as well.

As mentioned, it is also easier to incorporate mounting features such as holes and bosses in nonwoven screens such as screen 200 and screen 300 than it is to provide the same features in a woven screen. Such features may be incorporated into the screens at the same time as the raised features or raised features and pores are fabricated using the same techniques.

Nonwoven screens such as screen 200 and screen 300 may be fabricated using any one of or combination of techniques. For example, the screens may be fabricated using photoetching or chemical etching to create the pores and using deposition techniques to build up the raised features. This technique would be especially useful to make screens with pores and raised features having very small dimensions. The protrusion may be created by etching a "cutting line" where material is removed. The short lines between the ends of these cuts are then the bend lines, around which the protrusion may be folded up like a flap. The actual obstructions are created by mechanical means, such as a stamp which pushes the flap into the desired position.

Laser etching could be used to make pores. Mechanical forming methods could be used to bend the features into the desired position, creating protrusions. Alternatively metal stamping could be used to make the raised features or raised features and pores in a single step process. Additive manufacturing techniques such as 3D printing could be used to make the screens. Expanded metal techniques in which a sheet of metallic material is cut and stretched to form a regular pattern may be used.

Nonwoven screens may be manufactured using a variety of materials. Photoetching works on many types of metals thus allowing for material selection fulfilling corrosion resistance and particle adherence properties.

The above description includes examples of multiple embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Other aspects of the invention are set out in the following numbered clauses.

1. A system for removing particulate matter from gas in a discharge chamber of a gas discharge laser, the system comprising:
a filter in fluid communication with the discharge chamber, the filter comprising at least one nonwoven screen.
2. A system as in clause 1 wherein the filter is located within the discharge chamber.
3. A system as in clause 2 wherein the discharge chamber has a bottom and the filter is located adjacent the bottom of the discharge chamber.
4. A system as in clause 1 wherein the filter is located outside the discharge chamber and wherein the system additionally comprises at least one port connecting the filter to an interior of the discharge chamber.
5. A system as in clause 1 wherein the at least one nonwoven screen has a plurality of raised features, and wherein the dimensions and positioning of the raised features are such that a velocity of a portion of the gas passing over the screen around the raised features is reduced to below a settling velocity of particulate matter entrained in the gas.
6. A system as in clause 5 wherein the at least one nonwoven screen has a plurality of pores each adjacent a respective one of the plurality of raised features.
7. A system as in clause 1 wherein the gas is caused to flow over a surface of the at least one nonwoven screen in a first direction and the at least one nonwoven screen has a plurality of pores with an associated raised feature, the associated raised feature for each pore being positioned such that the raised feature is upstream of the pore when the gas is flowing in the first direction.
8. A system as in clause 1 wherein the gas is caused to flow over a surface of the at least one nonwoven screen in a first direction and the at least one nonwoven screen has a plurality of substantially rectangular pores with an associated substantially rectangular raised feature, the associated raised feature for each pore being positioned such that the raised feature is upstream of the pore when the gas is flowing in the first direction.
9. A system as in clause 8 wherein the pore has a length measured in the first direction in the range of about 1 mm to about 10 mm.
10. A system as in clause 8 wherein the pore has a width measured transverse to the first direction in the range of about 1 mm to about 10 mm.
11. A system as in clause 1 wherein the gas is caused to flow over a surface of the at least one nonwoven screen in a first direction and the at least one nonwoven screen has a plurality of substantially rectangular pores with an associated substantially rectangular raised feature, the associated raised feature for each pore being positioned such that the raised feature is downstream of the pore when the gas is flowing in the first direction.
12. A system as in clause 1 wherein the nonwoven screen is fabricated using a photoetching technique.
13. A system as in clause 1 wherein the nonwoven screen is fabricated using a metal stamping technique.
14. A system as in clause 1 wherein the nonwoven screen is fabricated using a chemical etching technique.
15. A system as in clause 1 wherein the nonwoven screen is fabricated using a laser cutting technique.
16. A system as in clause 1 wherein the nonwoven screen is fabricated using an expanded metal technique.
17. A system as in clause 1 wherein the nonwoven screen is fabricated using a deposition technique.
18. A method of removing particulate matter from gas in a discharge chamber of a gas discharge laser, the method comprising the steps of:
placing a filter in fluid communication with the discharge chamber, the filter comprising at least one nonwoven screen; and
flowing the gas over the filter.
19. A method as in clause 18 wherein the placing step comprises locating the filter within the discharge chamber.
20. A method as in clause 19 wherein the discharge chamber has a bottom and the placing step comprises locating the filter adjacent the bottom of the discharge chamber.
21. A method as in clause 18 wherein the placing step comprises locating the filter outside the discharge chamber and wherein the step of flowing the gas over the filter comprises flowing gas through at least one port connecting the filter to an interior of the discharge chamber.
22. A method of making a nonwoven screen comprising using photoetching to create an array of pores.
23. A method of making a nonwoven screen comprising using metal stamping to create an array of screen elements, each of the screen elements comprising a first structure defining a hole and a second structure defining a raised feature adjacent the hole.

Other implementations are within the scope of the following claims.

What is claimed is:

1. A system for removing particulate matter from gas in a discharge chamber of a gas discharge laser, the system comprising a filter in fluid communication with the discharge chamber, the filter comprising at least one nonwoven screen,
wherein the gas is caused to flow over a surface of the at least one nonwoven screen in a first direction and the at least one nonwoven screen has a plurality of pores with an associated raised feature, the associated raised feature for each pore being positioned such that the raised feature is upstream of the pore when the gas is flowing in the first direction.

2. A system as claimed in claim 1 wherein the at least one nonwoven screen is located within the discharge chamber.

3. A system as claimed in claim 2 wherein the discharge chamber has a bottom and the at least one nonwoven screen is located adjacent the bottom of the discharge chamber.

4. A system as claimed in claim 1 wherein the at least one nonwoven screen is located outside the discharge chamber and wherein the system additionally comprises at least one port connecting the at least one nonwoven screen to an interior of the discharge chamber.

5. A system as claimed in claim 1 wherein the nonwoven screen is fabricated using a photoetching technique.

6. A system as claimed in claim 1 wherein the nonwoven screen is fabricated using a metal stamping technique.

7. A system as claimed in claim 1 wherein the nonwoven screen is fabricated using a chemical etching technique.

8. A system as claimed in claim 1 wherein the nonwoven screen is fabricated using a laser cutting technique.

9. A system as claimed in claim 1 wherein the nonwoven screen is fabricated using an expanded metal technique.

10. A system as claimed in claim 1 wherein the nonwoven screen is fabricated using a deposition technique.

11. A system for removing particulate matter from a gas in a discharge chamber of a gas discharge laser, the system comprising a filter in fluid communication with the discharge chamber, the filter comprising at least one nonwoven screen, the at least one nonwoven screen having a surface with a plurality of substantially rectangular pores with an associated substantially rectangular raised feature, the associated raised feature for each pore being positioned such that the raised feature is upstream of the pore when a gas is flowing in a first direction across the surface.

12. A system as claimed in claim 11 wherein the pore has a length measured in the first direction in the range of about 1 mm to about 10 mm.

13. A system as claimed in claim 11 wherein the pore has a width measured transverse to the first direction in the range of about 1 mm to about 10 mm.

14. A method of removing particulate matter from gas in a discharge chamber of a gas discharge laser, the method comprising the steps of:
providing at least one nonwoven screen having a surface with a plurality of pores and a respective raised feature; and
flowing the gas over the surface such that a velocity of a portion of the gas passing over the surface around the raised features is reduced to below a settling velocity of particulate matter entrained in the gas.

15. A method as claimed in claim 14 wherein the placing providing step comprises locating the at least one nonwoven screen within the discharge chamber.

16. A method as claimed in claim 15 wherein the discharge chamber has a bottom and the providing step comprises locating the at least one nonwoven screen adjacent the bottom of the discharge chamber.

17. A method as claimed in claim 14 wherein the providing step comprises locating the at least one nonwoven screen outside the discharge chamber and wherein the step of flowing the gas over the surface comprises flowing gas through at least one port connecting the at least one nonwoven screen to an interior of the discharge chamber.

18. A system for removing particulate matter from gas in a discharge chamber of a gas discharge laser, the system comprising a filter in fluid communication with the discharge chamber, the filter comprising at least one nonwoven screen,
the at least one nonwoven screen having a surface with a plurality of raised features, the dimensions and positioning of the raised features being such that a velocity of a portion of the gas passing over the surface around the raised features is reduced to below a settling velocity of particulate matter entrained in the gas.

19. A system for removing particulate matter from a gas in a discharge chamber of a gas discharge laser, the system comprising a filter in fluid communication with the discharge chamber, the filter comprising at least one nonwoven screen, the at least one nonwoven screen having a surface with a plurality of pores with an associated raised feature, the associated raised feature for each pore being positioned such that the raised feature is upstream of the pore when a gas is flowing in a first direction across the surface.

* * * * *

UNITED STATES PATENT AND TRADEMARK OFFICE
CERTIFICATE OF CORRECTION

| | | |
|---|---|---|
| PATENT NO. | : 11,614,012 B2 | |
| APPLICATION NO. | : 16/763328 | |
| DATED | : March 28, 2023 | |
| INVENTOR(S) | : Ulrich Niemann et al. | |

It is certified that error appears in the above-identified patent and that said Letters Patent is hereby corrected as shown below:

In the Claims

Column 13, Lines 29-30, Claim 15: "wherein the placing providing step" should read --wherein the providing step--.

Signed and Sealed this
Sixteenth Day of May, 2023

Katherine Kelly Vidal
*Director of the United States Patent and Trademark Office*